US011456956B2

(12) United States Patent
White

(10) Patent No.: US 11,456,956 B2
(45) Date of Patent: *Sep. 27, 2022

(54) SYSTEMS AND METHODS FOR DYNAMIC CONNECTION PATHS FOR DEVICES CONNECTED TO COMPUTER NETWORKS

(71) Applicant: Verizon Patent and Licensing Inc., Basking Ridge, NJ (US)

(72) Inventor: William L. White, Georgetown, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/560,532

(22) Filed: Sep. 4, 2019

(65) Prior Publication Data

US 2020/0007444 A1 Jan. 2, 2020

Related U.S. Application Data

(63) Continuation of application No. 14/549,248, filed on Nov. 20, 2014, now Pat. No. 10,447,590.

(51) Int. Cl.
*H04L 45/00* (2022.01)
*H04L 45/302* (2022.01)

(52) U.S. Cl.
CPC ............ *H04L 45/70* (2013.01); *H04L 45/308* (2013.01)

(58) Field of Classification Search
CPC .............................. H04L 45/70; H04L 45/308
See application file for complete search history.

(56) References Cited

U.S. PATENT DOCUMENTS

| 5,881,050 | A | 3/1999 | Chevalier | |
|---|---|---|---|---|
| 6,760,775 | B1 | 7/2004 | Anerousis | |
| 6,766,373 | B1 * | 7/2004 | Beadle | H04L 45/00 709/203 |
| 6,862,276 | B1 | 3/2005 | Abrol | |
| 6,977,893 | B1 | 12/2005 | Lund | |
| 7,039,709 | B1 | 5/2006 | Beadle | |
| 7,945,678 | B1 | 5/2011 | Skene | |
| 7,984,294 | B1 | 7/2011 | Goringe | |
| 8,098,584 | B2 * | 1/2012 | Zhang | H04L 45/70 370/238 |
| 8,693,374 | B1 * | 4/2014 | Murphy | H04L 45/42 370/255 |

(Continued)

*Primary Examiner* — Glenton B Burgess
*Assistant Examiner* — Jihad K Boustany

(57) ABSTRACT

Systems and methods are disclosed for dynamically selecting a connection path between a client device and a server. One method includes receiving, over a network at a server, a connection request from a client device; authenticating, by the server, the connection request from the client device; determining, by the server, a connection path for the authenticated client device based on the connection request; determining, by the server, whether the connection path for the authenticated client device is a new connection path based on the connection request; and storing, by the server, the connection path to a connection database in association with the authenticated client device when the connection path is determined to be new, the connection database including a plurality of connection paths between the client device and the server.

19 Claims, 7 Drawing Sheets

(56) References Cited

U.S. PATENT DOCUMENTS

| | | | |
|---|---|---|---|
| 8,750,110 B2 * | 6/2014 | Baliga | H04L 45/125 370/230.1 |
| 10,158,539 B2 * | 12/2018 | Kim | H04L 43/08 |
| 2002/0159439 A1 | 10/2002 | Marsh | |
| 2003/0182419 A1 | 9/2003 | Barr et al. | |
| 2004/0047365 A1 * | 3/2004 | Williams | H04W 76/11 370/465 |
| 2004/0158640 A1 | 8/2004 | Philbrick | |
| 2004/0210671 A1 | 10/2004 | Beadle et al. | |
| 2005/0265345 A1 | 12/2005 | Chen | |
| 2006/0239282 A1 | 10/2006 | Dick | |
| 2006/0248600 A1 | 11/2006 | O'Neill | |
| 2007/0299954 A1 | 12/2007 | Fatula | |
| 2008/0250478 A1 | 10/2008 | Miller et al. | |
| 2009/0010168 A1 * | 1/2009 | Yurchenko | H04L 47/11 370/237 |
| 2009/0089863 A1 | 4/2009 | Vanniarajan | |
| 2010/0048191 A1 | 2/2010 | Bender | |
| 2010/0115048 A1 | 5/2010 | Scahill | |
| 2010/0250948 A1 | 9/2010 | Little | |
| 2010/0257281 A1 | 10/2010 | Patel | |
| 2011/0268439 A1 | 11/2011 | Gerstel | |
| 2011/0295956 A1 | 12/2011 | Pechanec | |
| 2012/0054296 A1 * | 3/2012 | Chaudhry | H04L 63/10 709/213 |
| 2012/0113813 A1 | 5/2012 | Haverinen | |
| 2012/0144066 A1 | 6/2012 | Medved | |
| 2013/0166709 A1 * | 6/2013 | Doane | H04L 45/00 709/223 |
| 2013/0185388 A1 | 7/2013 | Mackie | |
| 2013/0262666 A1 | 10/2013 | Balwani | |
| 2014/0025770 A1 * | 1/2014 | Warfield | G06F 16/256 709/213 |
| 2014/0052825 A1 | 2/2014 | Luecke | |
| 2014/0089503 A1 | 3/2014 | Thyni | |
| 2014/0150031 A1 | 5/2014 | Kumar | |
| 2014/0169330 A1 * | 6/2014 | Rommer | H04W 36/08 370/331 |
| 2014/0304421 A1 * | 10/2014 | Karaoguz | H04L 45/308 709/228 |
| 2014/0310792 A1 * | 10/2014 | Hyland | H04L 63/0815 726/8 |
| 2014/0355436 A1 | 12/2014 | Zhang | |
| 2014/0372583 A1 | 12/2014 | Tseng | |
| 2015/0105076 A1 | 4/2015 | Gupta | |
| 2015/0172905 A1 | 6/2015 | Qi | |
| 2015/0271865 A1 | 9/2015 | Carson | |
| 2015/0280963 A1 | 10/2015 | Bollapalli | |
| 2015/0281331 A1 | 10/2015 | Steiner | |
| 2016/0127152 A1 | 5/2016 | Balwani | |
| 2016/0174085 A1 | 6/2016 | Sung | |
| 2016/0191524 A1 | 6/2016 | Bathija | |

* cited by examiner

SYSTEMS AND METHODS FOR DYNAMIC CONNECTION PATHS FOR DEVICES CONNECTED TO COMPUTER NETWORKS

CROSS-REFERENCE TO RELATED APPLICATIONS

This application is a continuation of and claims the benefit of priority to pending U.S. application Ser. No. 14/549,248, filed Nov. 20, 2014, which is incorporated herein by reference in its entirety.

TECHNICAL FIELD

The present disclosure relates to dynamic connection paths for devices connected to computer networks. In particular, the present disclosure relates to methods, systems, and computer-readable mediums that optimize a device's connection path within a computer network by dynamically switching connection paths based on connection path types and conditions.

BACKGROUND

Computer networks, including intranets and the Internet, are typically based on client devices connecting to one or more servers via a single connection path. A client device may be attempting to request services from one or more servers providing the requested services. The client device may be provided with client software used to connect the client device to a server, which may be provided with server software that provides one or more services. Client devices and servers may also use their respective software to connect over a computer network.

The connection path between a client device and a server over a computer network may have several nodes, connection paths, and/or servers which are interconnected, either directly to each other or indirectly through one of the other servers. Based on a network configuration, the connection path of the client device to the server over the network may be via a telephone connection, an Ethernet connection, a wireless connection, a mobile connection, Bluetooth, satellite, cable, etc. Traditionally, only a single connection path is used when connecting the client device to the server.

SUMMARY OF THE DISCLOSURE

According to certain embodiments, methods are disclosed for dynamically selecting a connection path between a client device and a server. One method includes receiving, over a network at a server, a connection request from a client device; authenticating, by the server, the connection request from the client device; determining, by the server, a connection path for the authenticated client device based on the connection request; determining, by the server, whether the connection path for the authenticated client device is a new connection path based on the connection request; and storing, by the server, the connection path to a connection database in association with the authenticated client device when the connection path is determined to be new, the connection database including a plurality of connection paths between the client device and the server.

According to certain embodiments, systems are disclosed for dynamically selecting a connection path between a client device and a server. One system includes a data storage device storing instructions for dynamically selecting a connection path between a client device and a server; and a processor configured to execute the instructions to perform a method including: receiving, over a network at a server, a connection request from a client device; authenticating, by the server, the connection request from the client device; determining, by the server, a connection path for the authenticated client device based on the connection request; determining, by the server, whether the connection path for the authenticated client device is a new connection path based on the connection request; and storing, by the server, the connection path to a connection database in association with the authenticated client device when the connection path is determined to be new, the connection database including a plurality of connection paths between the client device and the server.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present invention is directed to methods, systems, and computer-readable mediums implemented within a controller server and/or a client system, which allows a client device and/or server to automatically select a connection path from the client device to a server. A connection path may be automatically selected based on certain criteria, such as bandwidth, connection type, present network conditions, such as high traffic and/or low traffic, etc. In an alternative embodiment, the connection path may be manually selected by one or both of a user of the client device and/or a user of the server.

In one embodiment, software on a client device and on a server may allow a multiple path connection between the client and server. Communications between the client device and server may use one connection path to upload data from the client device to the server, and another connection path to download data from the server to the client device. Alternatively, and/or additionally, a plurality of connection paths may be used by the client device and server to upload and download data simultaneously. In yet another embodiment, the client device may use one connection path at a time, and automatically select a different connection path based on the above-mentioned criteria.

Figure 1:
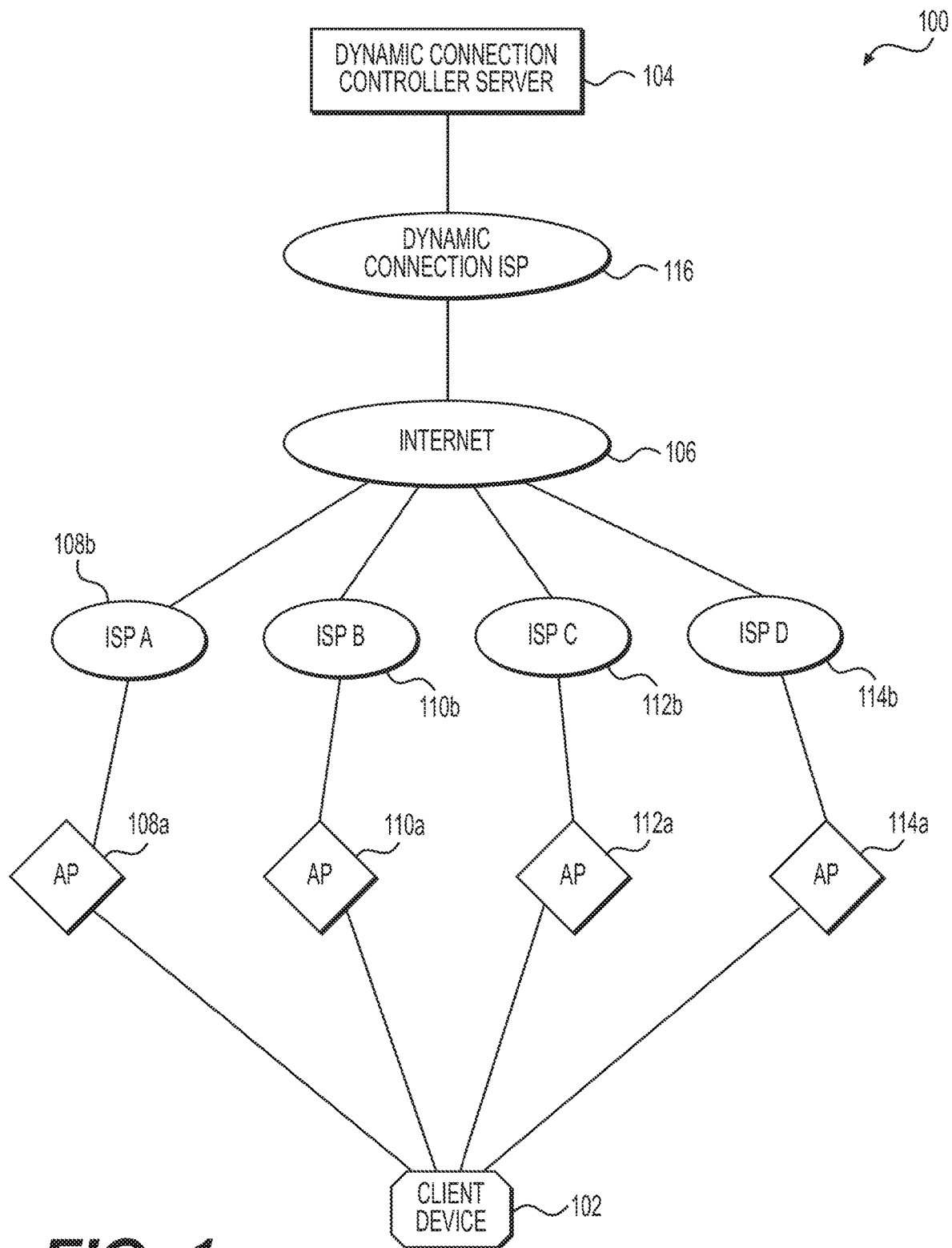
FIG. 1 illustrates an exemplary network environment in which a connection path from a client device to a server may be dynamically selected from a plurality of connection paths, according to embodiments of the present disclosure.
Figure 2:
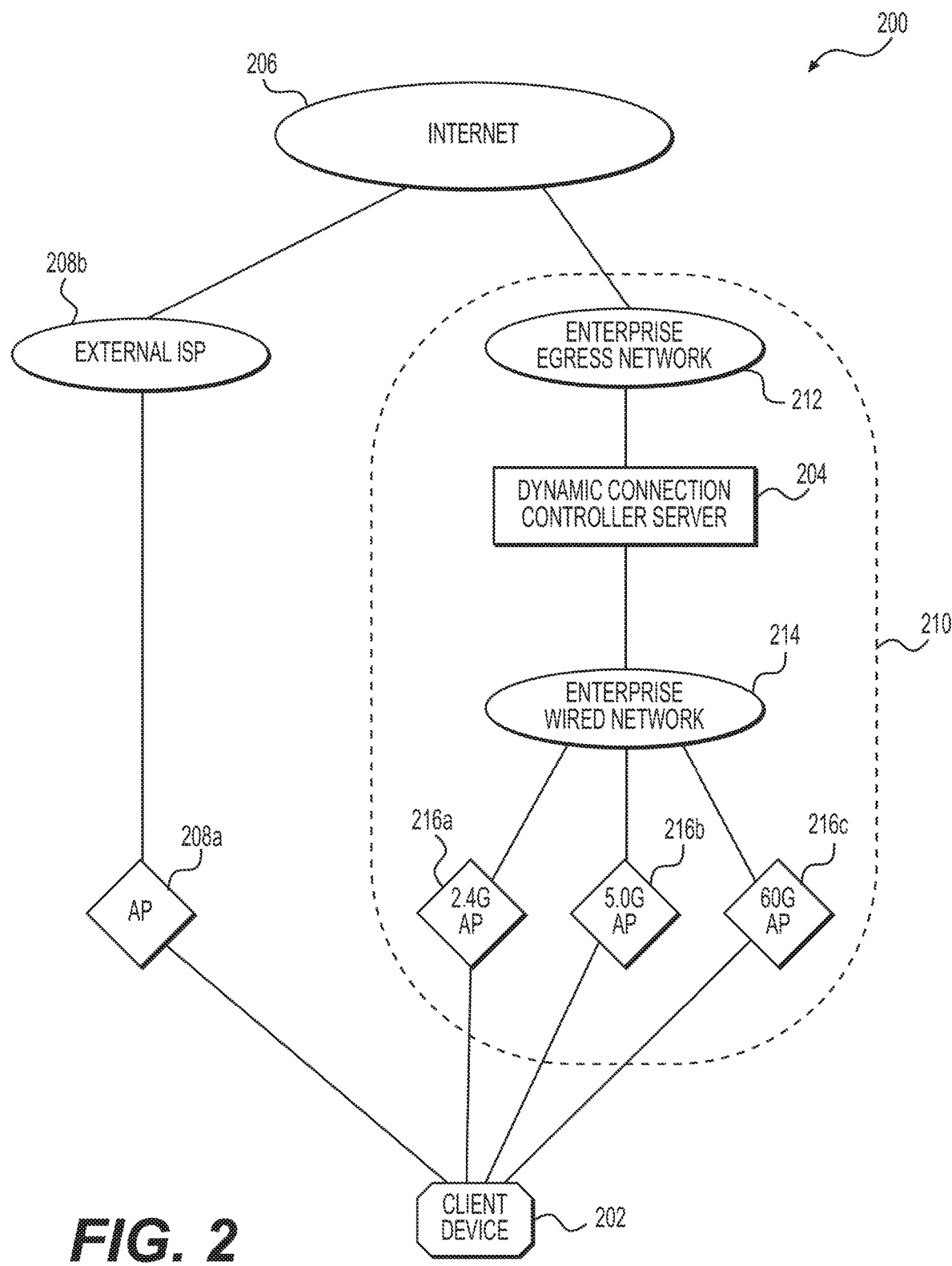
FIG. 2 illustrates another exemplary network environment in which a connection path from a client device to a server may be dynamically selected from a plurality of connection paths via the Internet and/or an intranet, according to embodiments of the present disclosure.

As shown in FIGS. 1 and 2, the present disclosure may be implemented using a variety of network environments and connection types. However, the present disclosure should not be limited to the network environments shown in FIGS. 1 and 2, as the present disclosure may be implemented with other types of connections and networks.

FIG. 1 shows a network environment 100 in which a connection path from a client device to a server may be dynamically selected from a plurality of connection paths. A client device 102 may include a hardware component which connects to a network and software applications stored in a memory and being run on the hardware component. The network environment 100 may include one or more access points ("APs") 108a, 110a, 112a, and 114a. Each AP may be connected to the Internet 106 via an Internet Service Provider ("ISP"). For example, as shown in FIG. 1, AP 108a connects to ISP 108b, which connections to the Internet 106. In one embodiment, the client device 102 may connect to the Internet 106 via one or more APs 108a, 110a, 112a, and/or 114a. For example, the client device 102 may include software, such as a browser application, that connects to the Internet 106 via AP 108a connected to ISP 108b, AP 110a connected to ISP 110b, AP 112a connected to ISP 112b, and/or AP 114a connected to ISP 114b.

Client device 102 may include software, such as a connection controller, that selects one or more connection paths from AP 108a connected to ISP 108b, AP 110a connected to ISP 110b, AP 112a connected to ISP 112b, and/or AP 114a connected to ISP 114b in order to connect to a dynamic connection controller server 104. Once a connection path is selected, the client device may connect to a dynamic connection controller server 104 via the selected connection path(s), the Internet 106, and a dynamic connection ISP 116.

The dynamic connection controller server 104 may receive a connection request from the client device 102. In response to the connection request, the dynamic connection controller server 104 may respond to the client device 102 via the dynamic connection ISP 116, the Internet 106, and one or more selected return connection path(s) of the previously selected connection paths of client device 102. As will be discussed below, the dynamic connection controller server 104 may also include server software that allow for connection request from client devices and authentication of one or more client devices.

FIG. 2 shows a network environment 200 in which a connection path from a client device to a server may be dynamically selected from a plurality of connection paths via the Internet and/or an intranet. A client device 202 may include a hardware component which connects to a network and software applications stored in a memory and being run on the hardware component. The network environment 200 may include an intranet 210 having one or more APs 216a, 216b, and 216c. Each AP within the intranet 210 may be connected to an enterprise wired network 214 that connects to a dynamic connection controller server 204. The dynamic connection controller server 204 may connect to the Internet 206 via an enterprise egress network 212. The network environment 200 may also include an AP 208a that connects to the Internet 206 via an external ISP 208b. When the client device 202 connects to the Internet 206, the client device may connect via the intranet 210 and/or via the AP 208a and external ISP 208b.

As shown in FIG. 2, a client device may be connected directly to the Internet 206 with an external ISP 208b, and indirectly to the Internet 206 via the Intranet 210. The Intranet 210 may be an internal network that provides access to the Internet 206 and/or other internal network components (not shown). As shown in FIG. 1, the client device 102 may connect to the dynamic connection controller server 104 via the Internet 106. In FIG. 2, the client device 202 may connect to the dynamic connection controller server 204 via the Internet 206 and/or via the enterprise wired network 214 via one or more APs 216a, 216b, 216c. The intranet 210 may include multiple server connections for a client device 202, as shown in FIG. 2. Intranet 210 may comprise a plurality of other servers (not shown), which may be connected by different types of wired and wireless connections. The client device 202 may connect to the other servers using different connection types, and may select connection paths, as will be described below.

Referring back to FIG. 1, a client device 102 may connect to one or more of the APs 108a, 110a, 112a, and/or 114a to connect one or more respective ISPs 108b, 110b, 112b, and/or 114b. Each of the ISPs that client device 102 connects to may then assign the client device 102 with a respective Internet Protocol ("IP") address. Upon receiving one or more IP addresses from a respective ISP 108b, 110b, 112b, and/or 114b, the client device 102 may then transmit a connection request to the dynamic connection controller server 104 via the Internet 106 and dynamic connection ISP 116. The dynamic connection controller server 104, on receiving the connection request, may initiate authentication of the client device 102.

In one embodiment, the client device 102 may select the one or more connection paths to transfer data to and from the dynamic connection controller server 106. Alternatively, the dynamic connection controller server 106 may select the one or more connection paths to transfer data to and from the client device 102. In yet another embodiment, both the client device 102 and the dynamic connection controller server 106 may select the one or more connection paths to transfer data. A connection path may be selected based on certain criteria, such as bandwidth, connection type, present network conditions, such as high traffic and/or low traffic, etc. For example, the one or more connection paths may be selected based on network congestion within an Intranet and/or the Internet. The network congestion may be determined by call-backs into a protocol stack and executing of a software application that utilizes the call-back to assist in choosing a better performing connection path. In an alternative embodiment, the connection path may be manually selected by one or both of a user of the client device and/or a user of the server.

Figure 3:
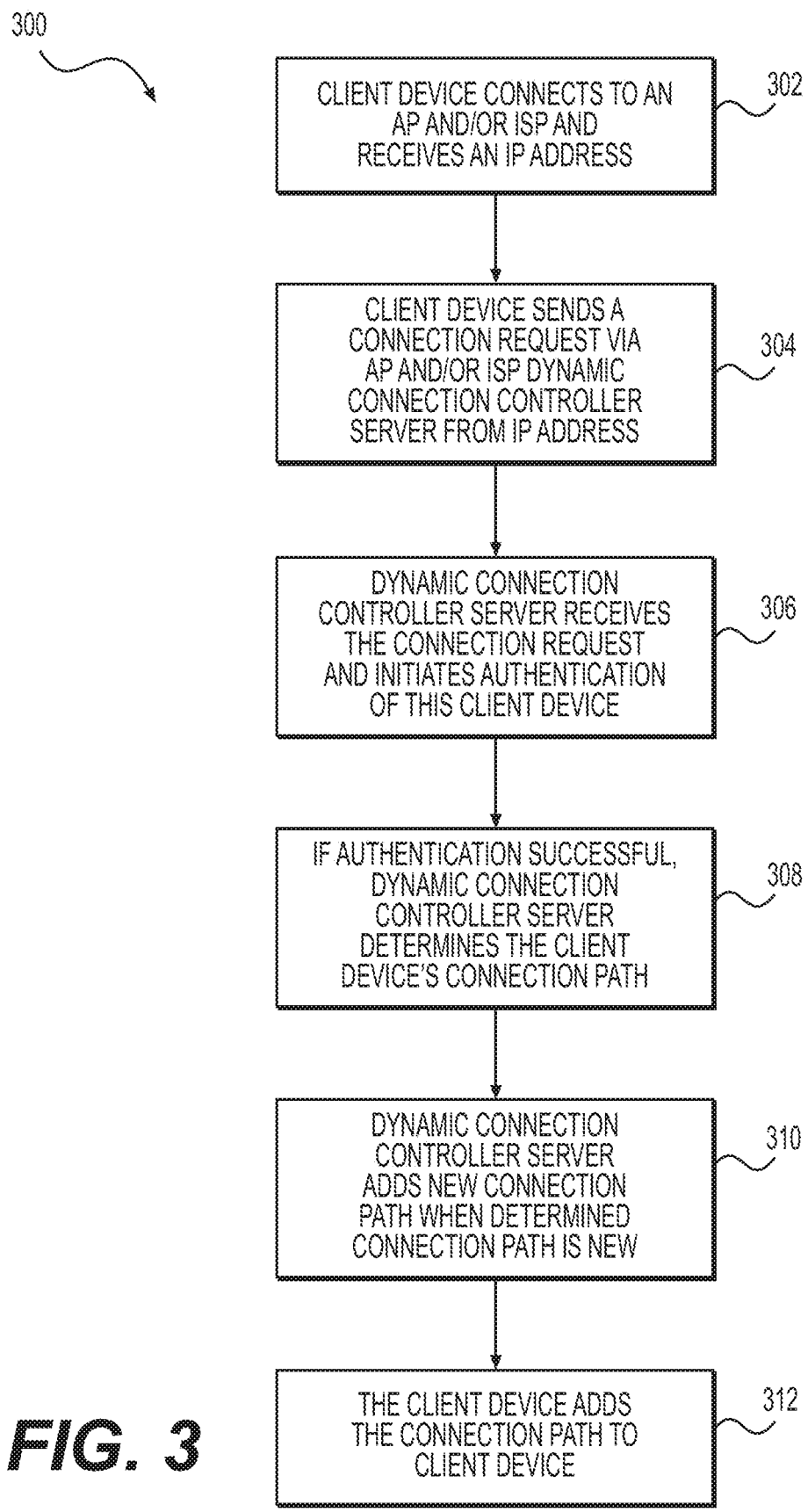
FIG. 3 depicts an exemplary method in which connection paths between a client device and a dynamic connection controller server are mapped, according to embodiments of the present disclosure.

Turning now to FIG. 3, an exemplary method 300 is depicted in which one or more connection paths between a client device and a dynamic connection controller server are mapped. The method 300, as shown, may begin at step 302 in which a client device, such as client device 102, 202, connects to an ISP and/or connects to an ISP via an AP and receives an IP address from the ISP. Once the client device has been assigned an IP address from the ISP, at step 304, the client device may then transmit a connection request via the AP and/or ISP to the dynamic connection controller server, such as dynamic connection controller server 104, 204, from the IP address assigned.

The connection request may be received by the dynamic connection controller server at step 306, and the dynamic connection controller server may initiate authentication of the client device transmitting the connection request. Authentication of the client device may be done using one or more methods, as discussed below with reference to FIG. 4.

If authentication of the client device at step 306 is successful, the dynamic connection controller server at step 308 may determine the client device's connection path. Determining the client device connection path may be based on the IP address of the client device assigned by the ISP and/or through other methods, as discussed below with reference to FIG. 5.

If the dynamic connection controller server determines that the connection path is new, the dynamic connection controller server may add the connection path in association with the client device to a database at step 310. The dynamic connection controller server at step 312 may then transmit a connection response to the client device, and the client device may store the connection path to the client device.

Figure 4:
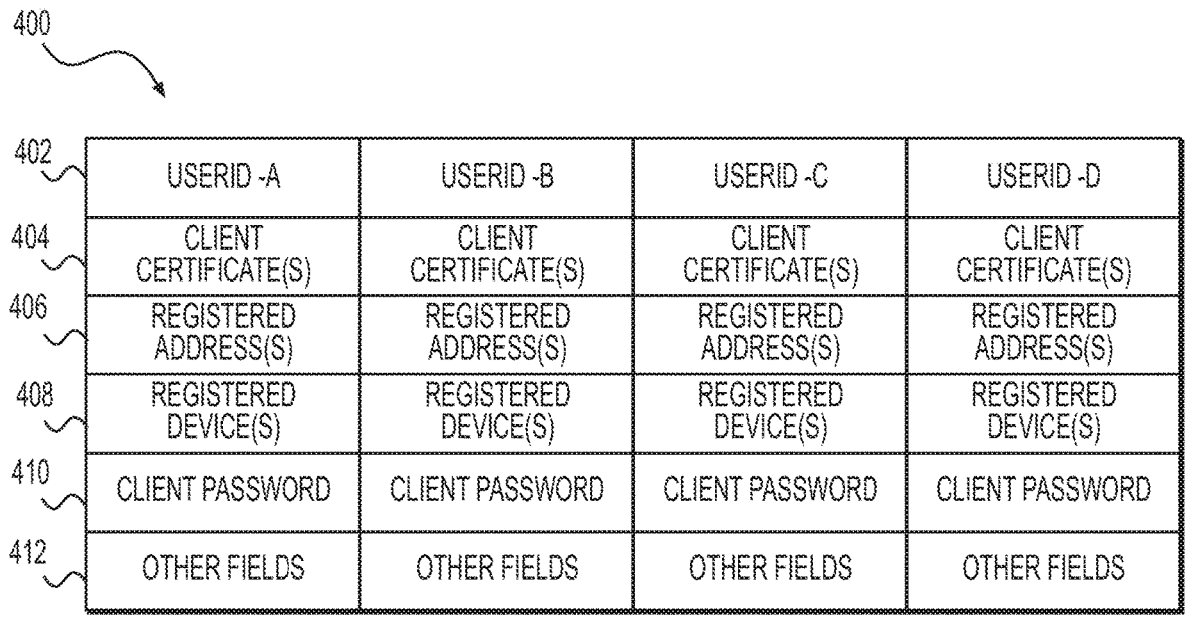
FIG. 4 depicts an exemplary authentication table for storing authentication information in an authentication database of the dynamic connection controller server, according to embodiments of the present disclosure.

FIG. 4 is an exemplary authentication table 400 for storing authentication information in an authentication database of the dynamic connection controller server. As shown in FIG. 4, a plurality of user identifiers 402 may be stored in the authentication database. For each user identifier 402, various authentication data may be stored. For example, for a user identifier "UserID—A," one or more client device certificates 404, one or more previously registered IP addresses 406, one or more previously registered client devices 408, a client/user password 410, and/or other fields 412 may be stored in association with the user identifier 402.

When a client device is being authenticated by the dynamic connection controller server, as discussed above with reference to FIG. 3, the dynamic connection controller server to authenticate the client device may request a user name and/or password from the client device transmitting the connection request. Alternatively, or additionally, the dynamic connection controller server to authenticate the client device may request a user name and determine that the IP address of the client device is a registered IP address stored in the authentication table 400 in association with the user name. In another embodiment, the dynamic connection controller server to authenticate the client device may determine that the client device is a previously registered client device and/or the IP address of the client device is a registered IP address stored in the authentication table 400.

Digital certificates, such as public key infrastructure ("PKI"), may be used by the client device and dynamic connection controller server to authenticate the client device and/or dynamic connection controller server. For example, the dynamic connection controller server may request authentication using a certificate of the client device before the dynamic connection controller server will permit access. In addition, a certificate may be used to identify each client device of a particular user identifier. When certificates are used for authentication, a copy of each certificate may be stored on the client device using the certificate, and stored with an authentication table in association with a user identifier.

Figure 5:
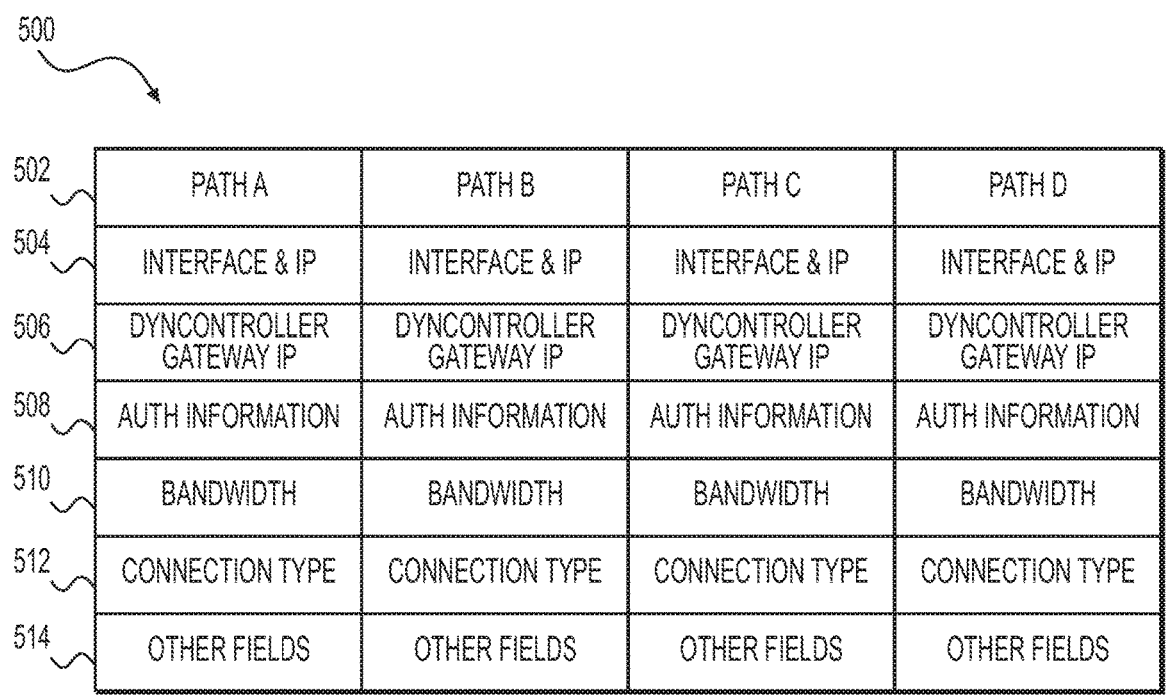
FIG. 5 depicts an exemplary connection path table for storing connection information in a connection database of the dynamic connection controller server, according to embodiments of the present disclosure.

FIG. 5 is an exemplary connection path table 500 for storing connection information in a connection database of the dynamic connection controller server. As shown in FIG. 5, a client device may have a plurality of connection paths 502 stored in the connection database. For each connection path 502, various connection data may be stored. For example, a connection path labeled "Path" A may have an interface and/or IP address 504 of the client device, a dynamic connection controller gateway IP address 506, authentication information 508 needed for the particular connection path, bandwidth information 510 about the connection path, a connection type 512, and/or other fields 514, which may be stored in association with a connection path 502 and/or a user identifier 402, as mentioned above.

When the dynamic connection controller server adds a new connection path, as discussed above with reference to FIG. 3, the dynamic connection controller server may store the connection information in the connection database. Additionally, when the dynamic connection controller server determines whether a connection path of the client device is a new connection path, the dynamic connection controller server may access the connection path table 500 of a connections database.

Figure 6:
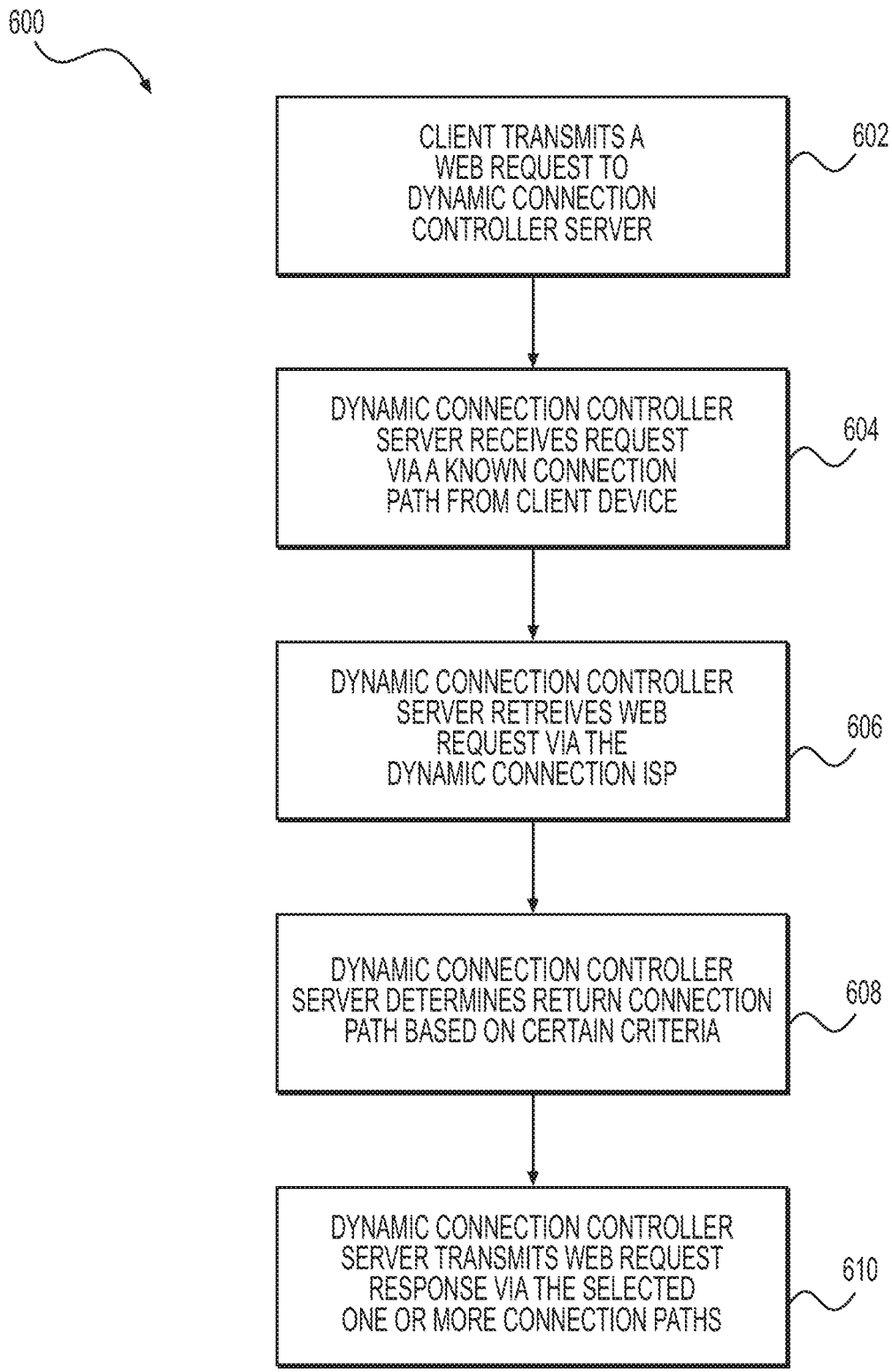
FIG. 6 depicts an exemplary method in which a web request of a client device is routed to a dynamic connection controller server that retrieves the requested content, according to embodiments of the present disclosure.

FIG. 6 is an exemplary embodiment of a method 600 in which a web request of a client device is routed to a dynamic connection controller server that retrieves the requested content. FIG. 6 may begin at step 602 in which a client device, such as client device 102, 202, transmits a web request to the dynamic connection controller server via a known connection path after authentication of the connection path and/or client device. The dynamic connection controller server at step 604 may then receive the web request via the known connection path from the client device. The known connection path may be previously selected by the dynamic connection controller server, by the client device, or by both the dynamic connection controller server and the client device.

At step 606, the dynamic connection controller server may retrieve the web request of the client device via the dynamic connection ISP, such as the dynamic connection ISP 116 and/or enterprise egress network 212. The dynamic connection controller server at step 608 may then determine and/or select a return connection path for the retrieved web request base on certain criteria, as discussed below. Then, at step 610, the dynamic connection controller server may transmit the retrieved web request and/or web request response to the client device via the determined and/or selected one or more connection paths.

The determination of the connection path and the return connection path may be by the dynamic connection controller server, by the client device, or by both the dynamic connection controller server and the client device. Selection of the connection path may be based on accessing the stored connection path database, as shown in FIG. 5, which stores specific connection paths and information about the connection paths. In one embodiment, selection of one or more connection paths may use the connection path table 500. As discussed above, the connection path table 500 may store connection information for each connection path associated with a client device. Connection information may include efficiency information of a particular connection path.

By default, a most recent connection path may be selected. Alternatively, a connection path that has the highest bandwidth may be selected by default. After a default connection path is used, alternative connection paths may be selected based on the above-mentioned criteria. For example, a fastest connection path may be chosen, all available connection paths may be chosen, a least busy connection path may be chosen, a most secure connection path may be chosen, two or more of the fastest connection paths may be chosen, and/or two or more least busy connection paths may be selected. Upon selection a connection path, the connection table 500 may be updated with updated connection information.

In one embodiment of the present disclosure, the client device, the dynamic connection controller server, or both may manually select a connection path based on a desired speed of the connection path. Once one or more connection paths are selected, one or more virtual tunnels may be set up between the client device and the dynamic connection controller server based on the one or more connection paths. The tunneling mechanism may use various protocols to implement a virtual point-to-point connection between the dynamic connection controller server and client device. Additional, secure encryption techniques, data integrity techniques, and/or other privacy techniques may be utilized to maintain what seems like a secure and dedicated point-to-point connection.

The tunneling mechanism may encapsulate data packets and/or data packet headers before the transmission of the data packet over an established tunnel. The transmission of a data packet may use non-tunneling information, such as the IP addresses of the ends of the tunnels, while the sensitive information, such as the source and destination IP addresses and sensitive payload data, remains encapsulated. Exemplary tunneling mechanisms include IP/IP tunneling, Generic Router Encapsulation ("GRE") tunneling, IP Security ("IPSec") tunneling, and Multi-Protocol Label Switching ("MPLS") tunneling.

When utilizing a tunneling mechanism, the client device and dynamic connection controller server may act as provider edge ("PE") devices that may be interconnected via a series of provider devices that form a network backbone, where the network backbone typically includes one or more public networks, such as, for example, the Internet or a wide area network ("WAN"). The one or more tunnels may be established between the client device and dynamic connection controller server. These tunnels, may be established at Layer-2 and/or Layer-3 of the International Standard Organization's Open System Interconnect ("ISO/OSI") network model.

Various tunnel protocols may be used to establish and maintain the tunnels, such as, for example, Resource Reservation Protocol ("RSVP"), Resource Reservation Protocol-Traffic Engineered ("RSVP-TE"), Label Distribution Protocol ("LDP"), Constraint-based Routing LDP ("CR-LDP"), Asynchronous Transfer Mode ("ATM"), Frame Relay, Generic Routing Encapsulation ("GRE"), IPSec, and the like. Once the tunnel has been established, the connection path between the client device and the dynamic connection controller server may act as a virtual point-to-point connection.

Once the connection paths are determined and the tunnels implemented, the client device, the dynamic connection controller server, and/or both may monitor the connection paths to determine connection speeds, connection bandwidths, latency, packet size, reliability, server capacity, security, congestion, cost, etc. Additionally, the client device, the dynamic connection controller server, and/or both may update the connection path table 500 with the updated data.

Figure 7:
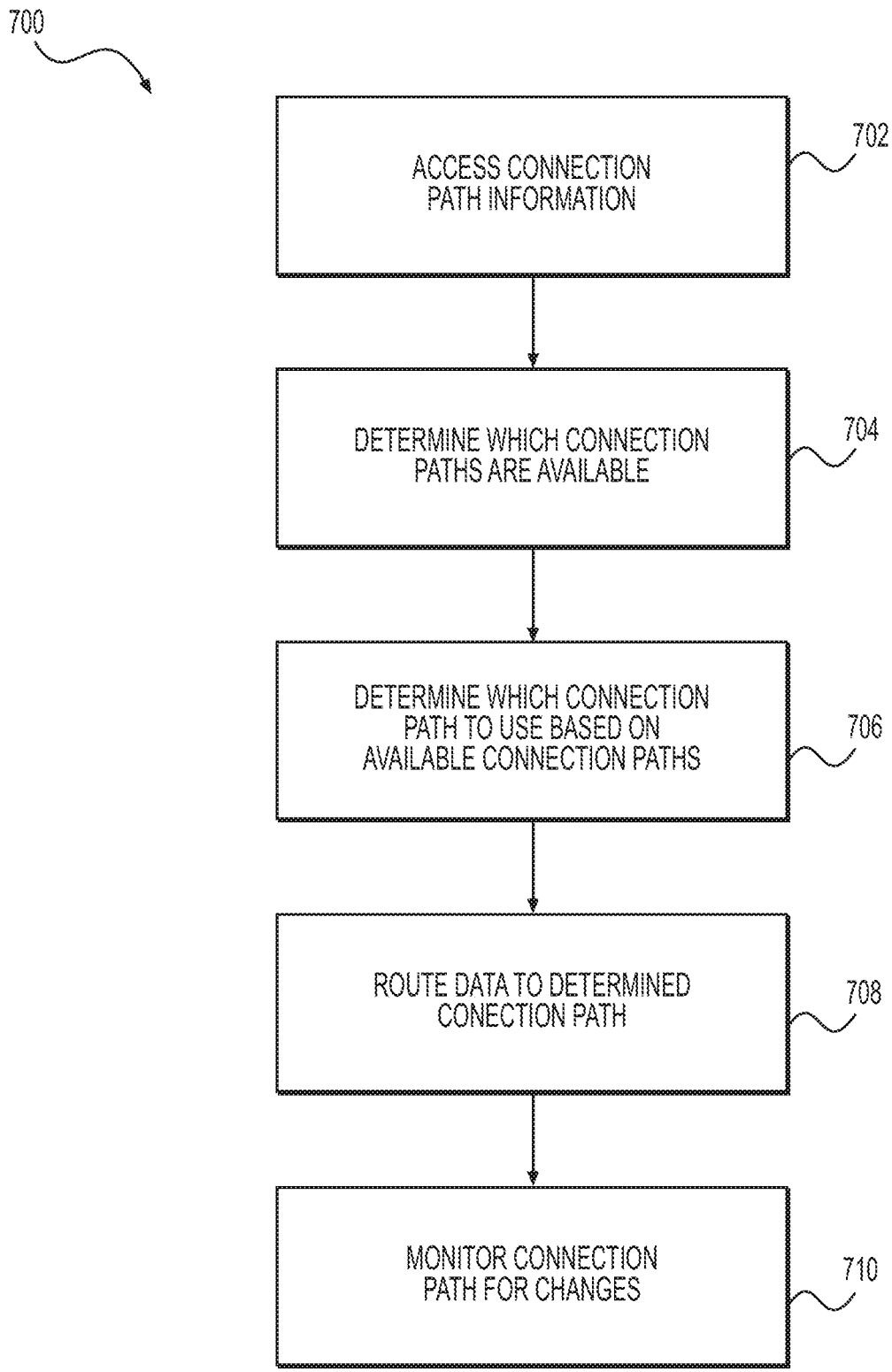
FIG. 7 depicts an exemplary method in which connection path information may be used in determining which of one or more connection paths to use, according to embodiments of the present disclosure.

FIG. 7 depicts a method 700 in which connection path information may be used in determining which connection path(s) to use. The method 700 may begin at step 702 in which connection path information is accessed by a client device, a dynamic connection controller server, and/or both. The connection path information may be the connection path table 500, as discussed above.

At step 704, the client device, the dynamic connection controller server, and/or both may determine which connection paths of a plurality of connection paths are available. The connection paths that are available may be determined by using the connection path table 500, as discussed above, and/or by determining current connection paths being used. Then, at step 706, the client device, the dynamic connection controller server, and/or both may determine which connection paths to use based on the determined available connection paths and based on the connection path information accessed.

After determining which connection path to use, at step 708, the dynamic connection controller server, and/or both may route data to the determined connection path. At step 710, the dynamic connection controller server, and/or both may then monitor the connection path for changes and update the connection path information if a change is detected. The dynamic connection controller server, and/or both may repeat method 700 if the connection path information changes.

In one embodiment, a client device may connect to the dynamic connection controller server via a plurality of connection paths. A first connection path of the plurality of connection paths may be a wireless connection via an AP, such as AP 208*a* as shown in FIG. 2. The first connection path may have a high bandwidth for data transfers but have a high latency. A second connection path of the plurality of connection paths may be another wireless connection via an AP, such as AP 216*a* as shown in FIG. 2. The second connection path may have a lower bandwidth than the first connection, but may have a lower latency than the first connection.

When transferring large amounts of data, the first connection path may be used because of the larger bandwidth. When transferring data that needs to be received quickly, the second connection path may be used because of the lower latency. During transfers, the client device may monitor the data transmissions and may control which connection path to use based on the data. The connection path used may be stored in a connection path table, such as connection path table 500.

While the client device in connected to the dynamic connection controller server, the client device, the dynamic connection controller server, and/or both may monitor the transferring data for a transfer of a previously routed type, and may reroute the data to an optimal connection path. In a preferred embodiment, the routing of the data happens without any significant loss of data and appears seamless.

Figure 8:
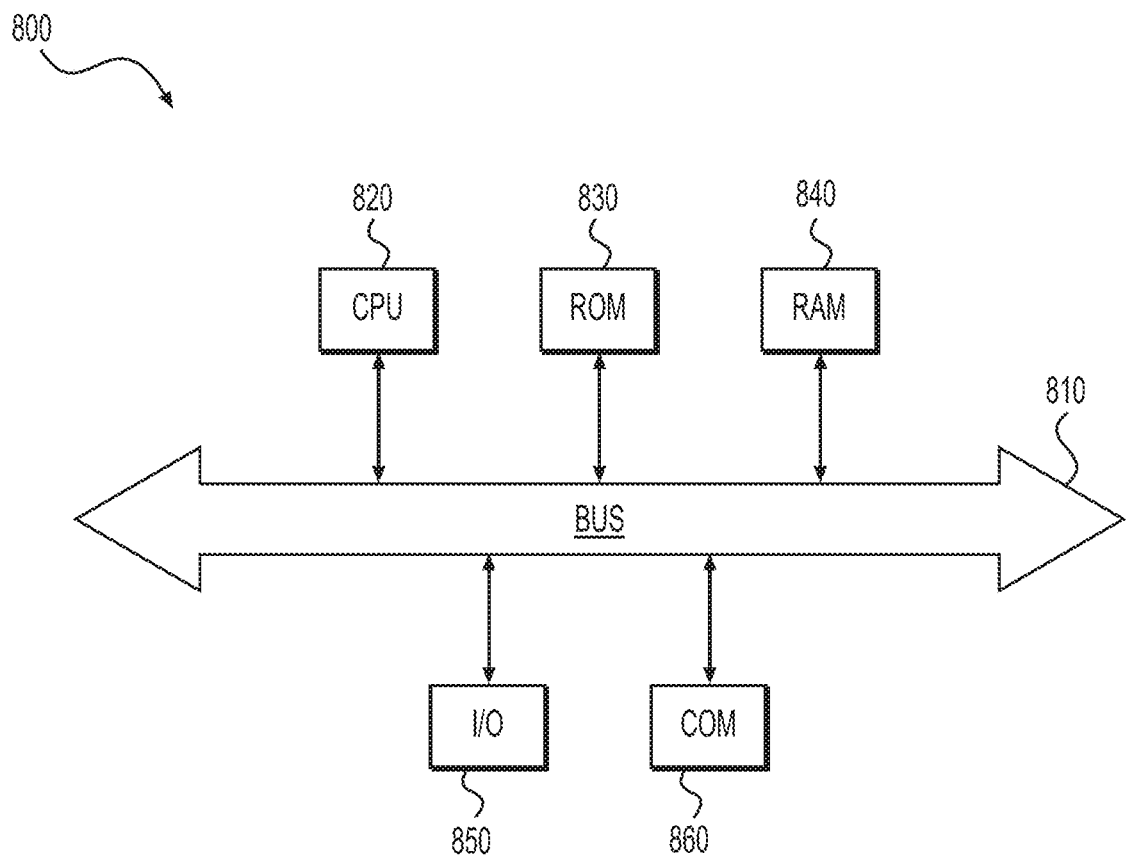
FIG. 8 is a simplified functional block diagram of a computer that may be configured as a device or server for executing the methods of FIGS. 3, 6, and/or 7, according to exemplary embodiments of the present disclosure.

FIG. 8 is a simplified functional block diagram of a computer that may be configured as client devices, APs, ISPs, and/or servers for executing the methods of FIGS. 3, 6, and 7, according to exemplary an embodiment of the present disclosure. Specifically, in one embodiment, any of the modules, servers, systems, and/or platforms may be an assembly of hardware 800 including, for example, a data communication interface 860 for packet data communication. The platform may also include a central processing unit ("CPU") 820, in the form of one or more processors, for executing program instructions. The platform typically includes an internal communication bus 810, program storage, and data storage for various data files to be processed and/or communicated by the platform such as ROM 830 and RAM 840, although the system 800 often receives programming and data via network communications 870. The server 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to mobile applications and to transmitting HTTP data, it should be appreciated that the presently disclosed embodiments may be applicable to any environment, such as a desktop or laptop computer, an automobile entertainment system, a home entertainment system, etc. Also, the presently disclosed embodiments may be applicable to any type of protocol stack.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for dynamically selecting a connection path between a client device and a server, the method comprising:
   receiving, over a network at the server, a connection request from the client device, the network including a plurality of access points, each of the plurality of access points associated with a different bandwidth;
   authenticating, by the server, the connection request from the client device by determining that (i) an IP address of the client device is a previously-registered IP address stored in an authentication table or (ii) a copy of a digital certificate associated with the client device is stored in the authentication table;
   determining, by the server, a first connection path from a plurality of connection paths for the client device based on a network congestion within the network, the network congestion determined by call-backs into a protocol stack, wherein each of the plurality of connection paths is a wireless connection via one of the plurality of access points;
   transferring data between the client device and the server using the first connection path;
   determining, by the server, a second connection path of the plurality of connection paths for the client device based on additional call-backs into the protocol stack; and
   in response to detecting a change in the first connection path, automatically rerouting the transferring of data between the client device and the server to the second connection path of the plurality of connection paths.

2. The method of claim 1, further comprising:
   receiving, at the server, a web request from the client device;
   retrieving, by the server, a web request response based on the web request from the client device;
   determining, by the server, a return connection path from a connection database; and
   transmitting, by the server, the web request response via the determined return connection path.

3. The method of claim 2, wherein determining the return connection path includes:
   determining, by the server, whether the return connection path is available based on criteria associated with the return connection path.

4. The method of claim 2, wherein determining the return connection path includes:
   monitoring the plurality of connection paths to determine a bandwidth of each connection path; and
   selecting, by the server, a connection path with a highest bandwidth.

5. The method of claim 1, wherein authenticating the connection request from the client device includes:
   determining, by the server, whether the client device has previously connected to the server.

6. The method of claim 1, wherein the network congestion includes latency and bandwidth measurements.

7. A system for dynamically selecting a connection path between a client device and a server, the system including:
   a data storage device storing instructions for dynamically selecting the connection path between the client device and the server; and the server comprising a processor configured to execute the instructions to perform operations including:

receiving, over a network, a connection request from the client device, the network including a plurality of access points, each of the plurality of access points associated with a different bandwidth;

authenticating the connection request from the client device by determining that (i) an IP address of the client device is a previously-registered IP address stored in an authentication table or (ii) a copy of a digital certificate associated with the client device is stored in the authentication table;

determining a first connection path from a plurality of connection paths for the client device based on a network congestion within the network, the network congestion determined by call-backs into a protocol stack, wherein each of the plurality of connection paths is a wireless connection via one of the plurality of access points;

transferring data between the client device and the server using the first connection path;

determining, by the server, a second connection path of the plurality of connection paths for the client device based on additional call-backs into the protocol stack; and in response to detecting a change in the first connection path, automatically rerouting the transferring of data between the client device and the server to the second connection path of the plurality of connection paths.

8. The system of claim 7, wherein the processor is further configured to execute the instructions to perform further operations including:

receiving a web request from the client device;

retrieving a web request response based on the web request from the client device;

determining a return connection path from a connection database; and transmitting the web request response via the determined return connection path.

9. The system of claim 8, wherein determining the return connection path includes:

determining whether the return connection path is available based on criteria associated with the return connection path.

10. The system of claim 8, wherein the processor is further configured to execute the instructions to perform further operations including:

monitoring the first connection path for changes in the first connection path.

11. The system of claim 8, wherein determining the return connection path from the plurality of connection paths includes:

monitoring the plurality of connection paths to determine a bandwidth of each connection path; and selecting a connection path with a highest bandwidth.

12. The system of claim 7, wherein authenticating the connection request from the client device includes:

determining whether the client device has previously connected to the server.

13. The system of claim 7, wherein the network congestion includes latency and bandwidth measurements.

14. A non-transitory computer-readable storage medium storing program instructions for dynamically selecting a connection path between a client device and a server, wherein when executed by the server, the program instructions are configured to cause the server to perform operations including:

receiving, over a network, a connection request from the client device, the network including a plurality of access points, each of the plurality of access points associated with a different bandwidth;

authenticating the connection request from the client device by determining that (i) an IP address of the client device is a previously-registered IP address stored in an authentication table or (ii) a copy of a digital certificate associated with the client device is stored in the authentication table;

determining a first connection path from a plurality of connection paths for the client device based on a network congestion within the network, the network congestion determined by call-backs into a protocol stack, wherein each of the plurality of connection paths is a wireless connection via one of the plurality of access points;

establishing a virtual tunnel between the client device and the server based on the first connection path;

transferring data between the client device and the server using the first connection path;

determining, by the server, a second connection path of the plurality of connection paths for the client device based on additional call-backs into the protocol stack; and in response to detecting a change in the first connection path, automatically rerouting the transferring of data between the client device and the server to the second connection path of the plurality of connection paths.

15. The non-transitory computer-readable storage medium of claim 14, wherein the program instructions are configured to cause the server to further perform operations including:

receiving a web request from the client device;

retrieving a web request response based on the web request from the client device;

determining a return connection path from a connection database; and transmitting the web request response via the determined return connection path.

16. The non-transitory computer-readable storage medium of claim 15, wherein determining the return connection path includes:

determining whether the return connection path is available based on criteria associated with the return connection path.

17. The non-transitory computer-readable storage medium of claim 14, wherein the program instructions are configured to cause the server to further perform operations including:

monitoring the first connection path for changes in the first connection path.

18. The non-transitory computer-readable storage medium of claim 15, wherein determining the return connection path includes:

monitoring the plurality of connection paths to determine a bandwidth of each connection path; and selecting a connection path with a highest bandwidth.

19. The non-transitory computer-readable storage medium of claim 14, wherein the network congestion includes latency and bandwidth measurements.

* * * * *